United States Patent
Brown et al.

(10) Patent No.: US 10,464,108 B2
(45) Date of Patent: Nov. 5, 2019

(54) WORKPIECE CLEANING

(71) Applicant: Seagate Technology LLC, Cupertino, CA (US)

(72) Inventors: Timothy Ronald Brown, Westminster, CO (US); Grant Nicholas Hester, Longmont, CO (US); Dennis Quinto Cruz, Longmont, CO (US); David Maxwell Harrold, Longmont, CO (US); Hans John Geittmann, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 260 days.

(21) Appl. No.: 15/687,851

(22) Filed: Aug. 28, 2017

(65) Prior Publication Data

US 2017/0354997 A1 Dec. 14, 2017

Related U.S. Application Data

(62) Division of application No. 14/168,823, filed on Jan. 30, 2014, now Pat. No. 9,744,567.

(51) Int. Cl.
| | |
|---|---|
| *B25J 11/00* | (2006.01) |
| *B08B 5/02* | (2006.01) |
| *B08B 15/04* | (2006.01) |
| *B25J 21/00* | (2006.01) |
| *B08B 15/02* | (2006.01) |

(52) U.S. Cl.
CPC ............ *B08B 5/02* (2013.01); *B08B 15/04* (2013.01); *B25J 11/00* (2013.01); *B25J 21/00* (2013.01); *B08B 15/023* (2013.01)

(58) Field of Classification Search
CPC ......... B08B 5/02; B08B 15/04; B08B 15/023; B25J 11/00; B25J 21/00
See application file for complete search history.

(56) References Cited

U.S. PATENT DOCUMENTS

| | | | |
|---|---|---|---|
| 5,316,560 A | 5/1994 | Krone-Schmidt et al. | |
| 6,143,092 A * | 11/2000 | Straub ...................... | D21F 1/32 134/1 |
| 6,656,017 B2 | 12/2003 | Jackson | |
| 7,134,946 B1 | 11/2006 | Jackson | |
| 8,313,579 B2 | 11/2012 | Cruz et al. | |
| 8,356,384 B1 | 1/2013 | Ferre et al. | |
| 8,387,631 B1 | 3/2013 | Thonghara et al. | |
| 2004/0098162 A1 | 5/2004 | McGuire | |
| 2005/0051198 A1 | 3/2005 | Laski | |

(Continued)

*Primary Examiner* — Sharidan Carrillo
(74) *Attorney, Agent, or Firm* — Crawford Maunu PLLC (57) ABSTRACT

Certain exemplary aspects of the present disclosure are directed towards apparatuses and methods which autonomously decontaminate parts. Parts to be cleaned are identified, and based on the identification of the part, a part specific cleaning program is initiated. During the cleaning, the part is manipulated about a gas supply in such a way that the drag force on the contamination particles attached to the part exceeds the contamination particles' surface adhesion force and accordingly is removed from the surface of the part. The removed contamination is then evacuated from the atmospheric environment near the part by a low pressure zone of a second gaseous material near the part.

19 Claims, 7 Drawing Sheets

(56) References Cited

U.S. PATENT DOCUMENTS

| | | |
|---|---|---|
| 2009/0229639 A1 | 9/2009 | Metzner et al. |
| 2011/0284029 A1* | 11/2011 | Baseman ................ B08B 13/00 134/18 |
| 2013/0035781 A1 | 2/2013 | Cameron |
| 2015/0211976 A1* | 7/2015 | David ................ G01N 15/0606 134/104.4 |
| 2015/0315714 A1 | 11/2015 | Vijay et al. |

* cited by examiner

WORKPIECE CLEANING

SUMMARY

Various example embodiments are directed to apparatuses and/or methods that autonomously remove contamination, such as particulate matter, from a surface of a part. Parts to be cleaned are identified by a part identifying circuit, and based on the identification of the part, a part-specific cleaning program is initiated. Such part identification facilitates cleaning of a variety of parts with minimal human-to-part interaction, which can otherwise impede the effectiveness of the cleaning process. During the cleaning, the part is manipulated about a gas supply of a first gaseous material in such a way that the drag force on the contamination particles attached to the part exceeds the particles' surface adhesion force, removing the contamination from the surface of the part. Such removal force is applied to respective surfaces of the part using the part-specific program to enhance the effectiveness and efficiency of the cleaning process and achieve a desirable contamination removal rate. Particles that are removed from the part are temporarily suspended in the atmospheric environment and removed to prevent re-contamination of the part being cleaned or other parts in the vicinity (e.g., parts that have been previously cleaned), using a low pressure zone of a second gaseous material around the part cleaning area. In various embodiments, one or more of the part manipulation, first gaseous material supply, and second gaseous material supply are dynamically modified based upon characteristics of particles in the vicinity and characteristics of the identified part, to mitigate contamination and/or otherwise facilitate removal of the particles from the environment.

According to an example embodiment, an apparatus is taught that cleans a variety of different parts. The apparatus utilizes a part identifying circuit to identify each part in an input staging area, which then transmits that information to a control circuit. The control circuit uses the identity of the part to determine a cleaning recipe, including a part cleaning path specific to the identified type of part. Based on the determined cleaning recipe, a first gaseous material (via a gas supply) is impacted along the identified part to dislodge particles from the part. The control circuit further controls a manipulator, which includes an electromechanical component that engages and manipulates the part, relative to the gas supply (during the cleaning process) according to the cleaning path. The manipulator is further used to move parts between the input staging area, a parts cleaning area, and an output staging area. The particles removed from the part being cleaned are temporarily suspended in the atmospheric environment, and are removed by a ventilator that supplies and exhausts a second gaseous material. Such removal of the particles mitigates contamination of parts in the output staging area by flowing the second gaseous material past the part in the parts cleaning area and exhausting the dislodged particles with the second gaseous material.

In a more specific embodiment, the gas supply dislodges particles from the part by introducing a laminar flow of the first gaseous material along the part and its surfaces. The control circuit monitors the flow of the first gaseous supply along the part and adjusts the cleaning recipe, as appropriate, to maintain such laminar flow. In many cases, laminar flow of the first gaseous material along the part and its surfaces increases contamination removal. In this embodiment, as yet a further safeguard to prevent the re-contamination of cleaned parts, the control circuit monitors particles adjacent the output staging area, and in response to the particulate level exceeding a threshold level, adjusting the part cleaning path, the first gaseous supply, and the second gaseous material supply to reduce the amount of particles being spread through the system.

In another specific embodiment, the control circuit further determines the cleaning recipe by accessing a database including a plurality of three-dimensional part renderings of respective parts and retrieving (from the database) a three-dimensional part rendering corresponding to the identified part. Based on the retrieved three-dimensional rendering, the control circuit generates and stores an executable cleaning recipe that when executed causes the manipulator to maintain the part relative to the gas supply in such a way as to maintain laminar flow along the part throughout the cleaning process.

One particular example embodiment is directed to decontaminating a hard disc drive part, specifically, a motor base assembly. To dislodge particles from the motor base assembly, the manipulator engages the motor base assembly with pins coupled to a DC power source, thereby operating the motor. The first gas supply is then directed towards the spinning motor to dislodge particles from the motor via the laminar flow of gas. The manipulator then disengages the motor base assembly from the pins and uses the laminar flow of gas to dislodge particles from a front side of the motor base assembly and then a back side of the motor base assembly. Such a method of cleaning a motor base assembly not only increases particulate removal from the assembly, but also prevents the escape of lubricating fluids from the motor.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure, including aspects defined in the claims. In addition, the term "example" as used throughout this application is only by way of illustration, and not limitation.

DETAILED DESCRIPTION

Aspects of the present invention are believed to be applicable to a variety of different types of devices, systems and arrangements involving the removal of contamination, such as particulate, from a workpiece. While the present invention is not necessarily so limited, various aspects of the invention may be appreciated through a discussion of examples using this context.

According to an example embodiment, an apparatus is taught that cleans a variety of different parts. The apparatus utilizes a part identifying circuit to identify each part in an input staging area, which a control circuit uses to determine a cleaning recipe including a part cleaning path specific to the identified type of part. Based upon the determined cleaning recipe, the control circuit sets a flow of a first gaseous material (via a gas supply) along the identified part. Where the drag force created by the flow of the first gaseous material on the contamination particles attached to the part exceeds the particles surface adhesion force, the particles are dislodged from the part. The control circuit also controls the manipulator, including an electromechanical component, to engage and manipulate the part relative to the gas supply (during the cleaning process) according to the cleaning path. The manipulator is further used to move parts between the input staging area, a parts cleaning area, and an output staging area. Particles that are removed from the part are temporarily suspended in the atmospheric environment and removed by a ventilator that supplies and exhausts a second gaseous material. The ventilator removes the particles by creating a low pressure area around the parts cleaning area that propels the particles through the ventilator's exhaust outlet. The removal of such particles mitigates the contamination of parts in the output staging area, and also prevents the contamination from settling back on the part being cleaned. In some embodiments, the first gaseous material supply is a cryogenic impingement fluid, and the second gaseous material supply is Earth Atmosphere (air).

In a more specific embodiment, the gas supply dislodges particles from the part by introducing a laminar flow of the first gaseous material along the part and its surfaces. The laminar flow is used to facilitate the dislodging of the particles, via interaction with the part surface. The control circuit monitors the flow of the first gaseous supply along the part and adjusts the cleaning recipe, as appropriate, to maintain such laminar flow. In many applications, the control circuit monitors and adjusts the angle of incidence of the flow of the first gaseous material relative to the parts surface being cleaned, to achieve desirable laminar flow. For instance, angles of incidence can be controlled to mitigate turbulent flow patterns. Certain embodiments utilize virtual models of the part being cleaned to account for surfaces of the part adjacent to surfaces to which the flow is directed (e.g., perpendicular surfaces that extend beyond the surface being cleaned), and which may affect the flow of the first gaseous material. The effect of adjacent surfaces in many cases can result in the flow of the first gaseous material on a target surface being somewhat or even entirely turbulent, significantly reducing the contamination removal.

In some implementations, the control circuit also monitors particles adjacent the output staging area. When the particulate level meets or exceeds a threshold level, the control circuit adjusts one or more of the part cleaning path, the first gaseous supply, and the second gaseous material supply (for ventilation) to reduce the amount of particles being spread through the system.

According to various aspects of the present disclosure, the control circuit determines (e.g., generates data for) the cleaning recipe by specifying characteristics of the first and second gaseous material as respectively used for cleaning and removing particulates. Based on the cleaning recipe for the identified part, the control circuit adjusts at least one of gas pressure and gas type of the first and second gaseous material supplies. The adjustment of pressure and gas type can take place throughout the cleaning process, and may be carried out using feedback pertaining to aspects such as particulate level (e.g., as may vary depending on the condition of the part) and ambient conditions. For example, the first gaseous material pressure can be adjusted to maintain laminar flow along a part surface where an adjacent surface affects the flow rate of the first gas.

In some implementations, the control circuit also monitors particles adjacent the output staging area, and adjusts one or more of the part cleaning path, the first gaseous supply, and the second gaseous material supply in response to the particulate level exceeding a threshold level (e.g., to reduce the amount of particles being spread through the system). For example, adjustments to the part cleaning path may be carried out to modify the trajectory of particles being removed from the part. In certain embodiments, the flow of portions of the first gaseous material deflecting from surfaces of the part is predicted and used to control the resulting spread of particulates carried by the first gaseous material. In other embodiments, the cleaning recipe is adaptively modified to maintain laminar flow of the first gaseous material along the part, by both re-calculating the part cleaning path along which the part is manipulated and adjusting a pressure of the first gaseous material.

In other embodiments, the first gaseous material supply utilizes a nozzle to direct the first gaseous material at the part being cleaned, focusing the flow of the first gaseous material and the trajectories of removed particles from the part. This nozzle may be adjusted to control aspects of the flow such as volume and velocity. With the trajectories of the removed particles estimated, the control circuit can re-calculate the part cleaning path and adjust gas flow applied via the nozzle, as appropriate to maintain laminar flow of the first gaseous material along the part and mitigate or prevent contamination of parts in the output staging area.

In certain embodiments, the control circuit determines the cleaning recipe by accessing a lookup table containing types of parts associated with respective cleaning recipe data sets. The control circuit then loads a cleaning recipe data set that corresponds to the identified type of part to be cleaned. For instance, each cleaning recipe data set may include metadata or other information that specifies a part or parts for which the cleaning recipe data set is to be used. In certain embodiments, two or more cleaning recipe data sets can be assigned to a particular part, such as for use with different types of parts having some features that are common, and other features that differ. Based on the cleaning recipe, the control circuit controls the manipulator to manipulate the part along a cleaning path defined in the loaded cleaning recipe data set (e.g., by executing stored instructions using the cleaning recipe data and/or as presented in the cleaning recipe data).

In another specific embodiment, the control circuit accesses a database including a plurality of three-dimensional part renderings of respective parts and retrieves (from the database) a three-dimensional part rendering corresponding to the identified part. Based on the retrieved three-dimensional rendering, the control circuit generates and stores a cleaning recipe, such as executable instructions and/or input data for such executable instructions. When the cleaning recipe is implemented, the manipulator maintains the part relative to the gas supply in such a way as to maintain laminar flow along the part throughout the cleaning process.

In some embodiments, the control circuit positions the part based upon the cleaning recipe, relative to the gas supply to achieve a desired angle of incidence and impact conditions such as force and drag of the first gaseous material on the part. The angle of incidence and the impact of the first gaseous material on the part can be used to control a resulting flow as including laminar or non-laminar characteristics, or a degree of such characteristics. As discussed above, in many cases, laminar flow is desirable for removing contaminate from the surfaces of the part being cleaned.

According to various embodiments of the present disclosure, an apparatus as discussed above includes a loader that loads trays with parts that include motor base assemblies and voice coil motors. The parts are loaded in the input staging area in an orientation and position known to the control circuit. The part identifying circuit may identify the part in the input staging area in a variety of ways, such as by utilizing RFID tags on each part, scanning bar codes on the parts, or through three-dimensional imaging identification. In an embodiment utilizing RFID tags, the part identifying circuit receives the signals transmitted by each part in the immediate vicinity of its receiver, and based on the received information identifies the parts (a lookup table may be utilized to associate a transmitted radio signal with a part). In an embodiment using barcodes, the location (orientation and position) of the barcode (on the part) relative to the input staging area could be the same for each part placed therein. This can be accomplished with specialized trays that each hold only one type of part. Based on the positive identification of the parts in the input staging area, a lookup table is utilized to associate the identified part with a known part placement scheme in the loader apparatus. The manipulator thereby retrieves each part from the input staging area based upon the known orientation and placement of each part.

In yet further embodiments, additional steps are taken to control the fall-out of dislodged particles onto clean parts in the output staging area. The ventilator, in many embodiments, positions the second gaseous material flow between the part from which the particles are being dislodged and the output staging area, making it difficult for particles to traverse the second gaseous material flow and deposit on clean parts. In such an embodiment, a low pressure area is created around the part being cleaned by a ventilator exhaust that evacuates the second gaseous material faster than a ventilator supply can provide the second gaseous material to the parts cleaning area. The flow of the second gaseous material and the subsequent low pressure area minimizes the amount of particles that deposit on clean parts in the output staging area. To further prevent contamination of parts in the output staging area, the first gaseous material supply includes a nozzle to direct the laminar flow of a first gaseous material along the part. The nozzle may be implemented to focus the directionality of the spray of contamination from the parts being cleaned. In some implementations, the control circuit adjusts the output flow of the ventilator based on a position of the nozzle relative to the part that is known to create increased contaminate ejection and/or ejections with trajectories directed toward the output staging area. In certain embodiments, the control circuit corrects for (or prevents) the implementation of cleaning recipes that result in undesirable contamination, such as recipes that result in the ejection of particles with trajectories directed toward the output staging area. For example, by changing the angle of incidence of the part relative to the nozzle or decreasing the gas supply pressure, dislodged particles can be controlled. By changing the angle of incidence of the first gaseous material flow, the control circuit can change the trajectory of gas flow (including contamination) after impact with the part so that the trajectory of particulates is directed away from the output staging area. Decreasing the gas supply pressure can similarly decrease the contamination of clean parts in the output staging area, as the decreased velocity of the contamination is less likely to overcome the force of the low pressure area and gravity drawing the contamination down into the ventilation output.

Various aspects of the present disclosure are also directed towards methods, in accordance with the embodiments presented above. One particular example embodiment is directed to decontaminating a hard disc drive part, specifically, a motor base assembly. To dislodge particles from the motor base assembly, the manipulator engages the motor base assembly to pins coupled to a DC power source, thereby operating the motor. The first gas supply is then directed towards the spinning motor to dislodge particles from the motor via a laminar flow of the first gaseous material. Such a method of cleaning a motor mitigates or prevents the leakage of lubricating fluid from the motor housing. The manipulator then disengages the motor base assembly from the pins and uses the laminar flow of gas to dislodge particles from a front side of the motor base assembly and then a back side of the motor base assembly. This method of cleaning a motor base assembly has been found to significantly increase the removal of contamination from the part.

In certain embodiments, an end effector is attached to the manipulator and used to manipulate an identified type or part. Prior to manipulating the part, an end effector is selected, based on the identified type of part in the input staging area (e.g., via part identification as discussed in more detail above). If the appropriate end effector is coupled to the manipulator, the control circuit can continue with the loaded part cleaning recipe. If the appropriate end effector is not coupled to the manipulator, the coupled end effector is decoupled and an appropriate end effector is coupled. In other embodiments, the coupling/decoupling of the end effector to the manipulator can be performed manually. In some embodiments the system includes holders for each end effector whereby the control circuit is able to accurately position the manipulator for coupling and de-coupling end effectors.

Figure 1:
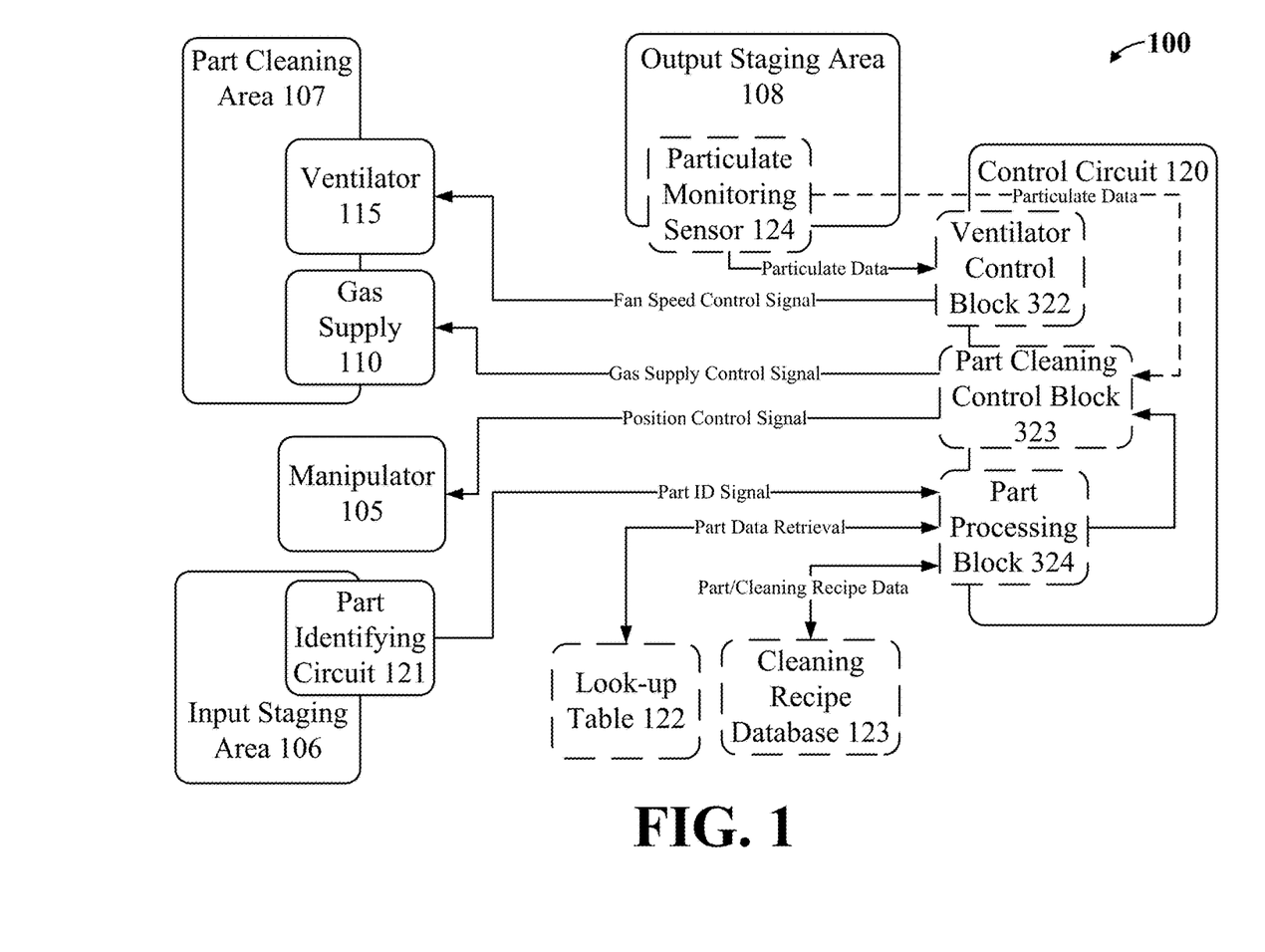
FIG. 1 is a circuit diagram of a workpiece cleaning apparatus, consistent with various aspects of the present disclosure.

Turning now to the figures, FIG. 1 shows a workpiece cleaning apparatus 100, in accordance with another example embodiment. Contaminated parts are loaded into the input staging area 106, where each loaded part is identified by part identifying circuit 121. The part identification can be carried out as discussed in more detail above, such as by using RFID tags, barcodes or three-dimensional scanning. The part identifying circuit 121 transmits part identification data to control circuit 120. The control circuit 120 uses the part identification data to control a manipulator 105, gas supply 110 and ventilator 115 for cleaning parts in part cleaning area 107. Clean parts are then moved to the output staging area 108. These aspects may be carried out using, for example, one or more embodiments as described above in connection with some or all components of the apparatus 100.

In some embodiments, the control circuit 120 includes a part processing block 324 that receives the part identification data and translates the bar code or other identification information to identify a part and provide a cleaning recipe associated with the known part to part cleaning control block 323. The part processing block 324 queries look-up table 122 to associate identification information of the part with a part number. If the look-up table 122 contains such an association, look-up table 122 transmits the part number to the part processing block 324. The part processing block 324 then queries the cleaning recipe database 123 with the part number to determine whether a cleaning recipe exists for the identified part. If a cleaning recipe for the part exists, the recipe is transmitted to part cleaning control block 323 of the control circuit 120 via the part processing block 324. The cleaning recipe provides control instructions for the manipulator 105 which moves the part to and from the input staging area 106, part cleaning area 107, and output staging area 108, as well as manipulates the parts position and orientation while being cleaned. The cleaning recipe also provides instructions for the gas supply 110 during the cleaning process (e.g., activation/deactivation, gas pressure, nozzle selection, etc.).

To mitigate or prevent the contamination of clean parts in the output staging area 108, a particulate monitoring sensor 124 is positioned in the output staging area and monitors particulate levels thereof. The particulate monitoring sensor 124 outputs particulate level data to a ventilator control block 322 of the control circuit 120. When the sensed particulate level exceeds a programmed threshold level, the ventilator control block 322 increases the fan speed control of ventilator 115, thereby reducing the amount of contamination that settles in the output staging area 108. In some embodiments, the particulate data from the particulate monitoring sensor 124 is transmitted directly to the part cleaning control block 323 of control circuit 120. Where the particulate level exceeds a programmed threshold, the part cleaning control block 323 can temporarily pause cleaning operations, and/or modify the cleaning recipe to minimize clean part contamination. Modification of the cleaning recipe can include re-programming a portion of the cleaning recipe (the portion where a contamination threshold level was exceeded) to reduce the pressure of gas from the gas supply 110, minimize the angle of incidence to further maintain laminar flow of the gas along the part, and/or calculate the trajectory of the gas after impacting the part's surfaces and adjust the recipe to minimize trajectories in the direction of the output staging area 108.

Figure 2:
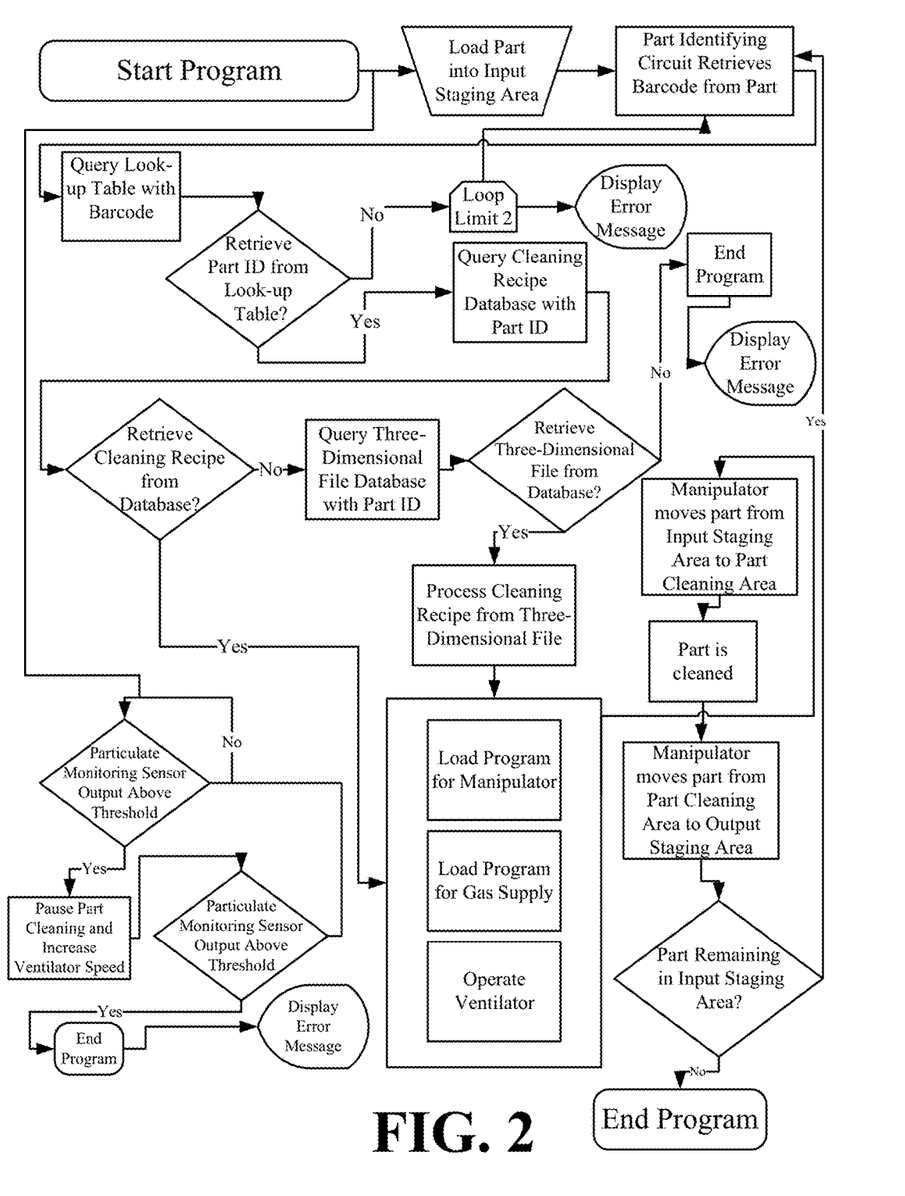
FIG. 2 is a flow diagram for workpiece cleaning, consistent with various aspects of the present disclosure.

FIG. 2 illustrates a flow-diagram of a cleaning approach in accordance with another embodiment. The cleaning approach may, for example, be implemented with an apparatus as shown in connection with one or more figures. Upon initiation of a cleaning recipe, a sub-routine is initiated and used to mitigate or prevent contamination of parts in an output staging area, based upon monitored particulates that are removed from parts being cleaned. Specifically, when an output of a particulate monitoring sensor exceeds a programmed threshold level, part cleaning can be modified such as by increasing ventilator speed and/or modifying aspects related to the removal of the particulates.

The initiation of the cleaning program also activates a primary routine that waits for a manual operation of parts being loaded into the input staging area. After parts are loaded, a part identifying circuit retrieves barcode information from a part to be cleaned. A lookup table is queried to associate the barcode information with a part ID. If the look-up table fails to return a part ID, the barcode is rescanned and again forwarded to the lookup table. If the lookup table again fails to return a part ID, the program is paused, and an error display message is presented to the operator. If the lookup table retrieves a part ID, a cleaning recipe database is then queried with the part ID. If the cleaning recipe database fails to return a cleaning recipe for the identified part, a three-dimensional file database is then queried from which a cleaning recipe is computed. If the cleaning recipe database returns a cleaning recipe for the identified part (or after the cleaning recipe has been computed), the manipulator and gas supply are both loaded with their respective programs for cleaning the identified part, and the ventilator is activated.

When the manipulator, gas supply, and ventilator indicate ready status, the cleaning recipe is executed and the manipulator moves the part from the input staging area to the part cleaning area, the part is cleaned (in accordance with the loaded cleaning recipe), and the part is moved to the output staging area. The part cleaning is controlled using one or more approaches as described herein, such as that described in connection with FIG. 1 and as may include modifying one or more of a part cleaning path, gas supply, direction of gas applied to a part (e.g., as may relate to laminar flow), and ventilator operation. The program then repeats until all parts in the input staging area have been cleaned, after which the program ends.

Figure 3A:
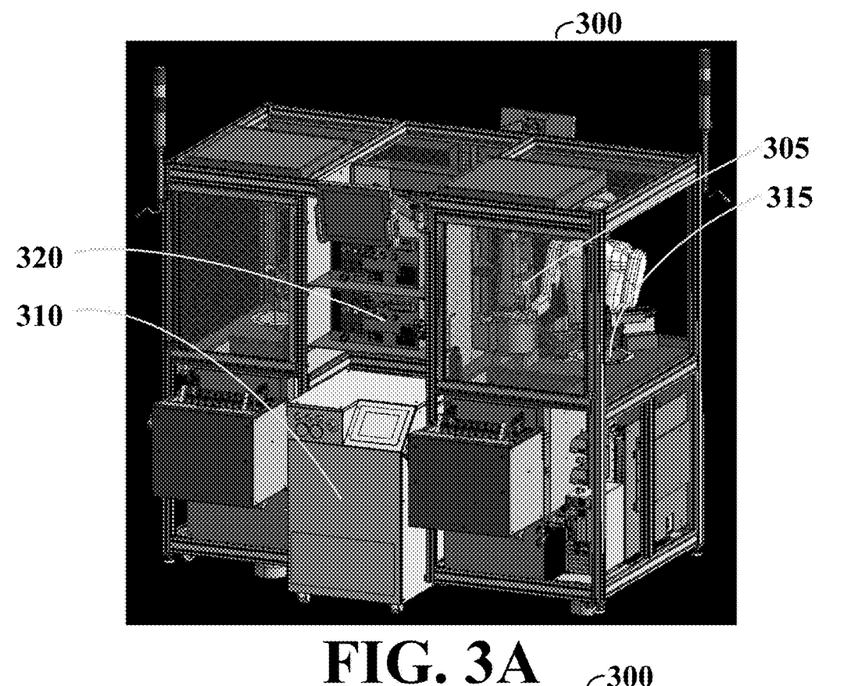
FIG. 3A is a perspective view of a workpiece cleaning apparatus, consistent with various aspects of the present disclosure.
Figure 3B:
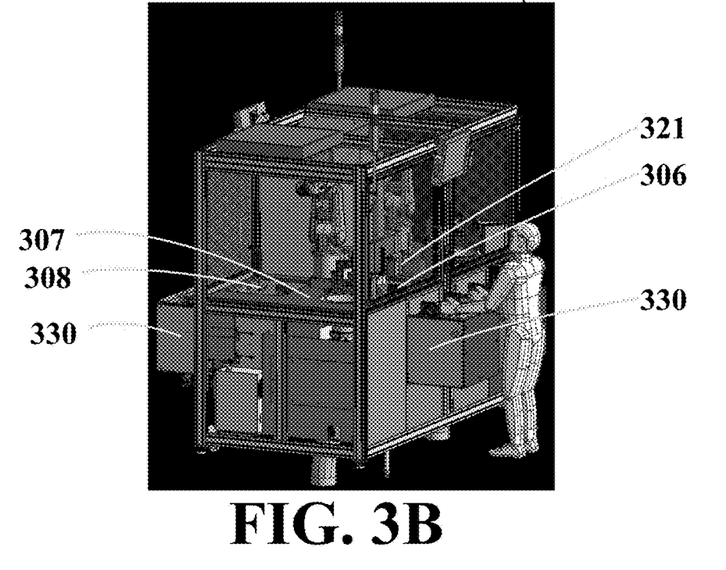
FIG. 3B is a perspective view of a workpiece cleaning apparatus, consistent with various aspects of the present disclosure.

FIGS. 3A and 3B show perspective views of the front and back, respectively, of a workpiece cleaning apparatus 300. The workpiece cleaning apparatus 300 has two separate stations for cleaning parts. Each cleaning station includes an input staging area 306 where contaminated parts are loaded and wait to be cleaned, a parts cleaning area 307, and an output staging area 308 where clean parts wait to be removed from the workpiece cleaning apparatus 300. The workpiece cleaning apparatus 300 is controlled by control circuit 320 which is also communicatively coupled to manipulator 305, gas supply 310, ventilator 315, and part identifying circuit 321. The control circuit 320 and other components in the apparatus 300 may, for example, be implemented in connection with approaches as described with FIG. 1 above.

Each part in the input staging area 306 is identified by the part identifying circuit 321. Based on the part identified, the control circuit 320 loads a part cleaning recipe associated with the part to be cleaned. The manipulator 305 moves the identified part from the input staging area 306 to the parts cleaning area 307. While in the parts cleaning area, the manipulator 305 moves the part in relation to a nozzle, based on the part cleaning recipe, and delivers a first gaseous material from the gas supply 310 that impacts the part's surfaces resulting in the removal of contamination. The contamination is then removed from the atmospheric environment within the workpiece cleaning apparatus 300 by the ventilator 315. The manipulator 305 then places the clean part in the output staging area 308.

Figure 4:
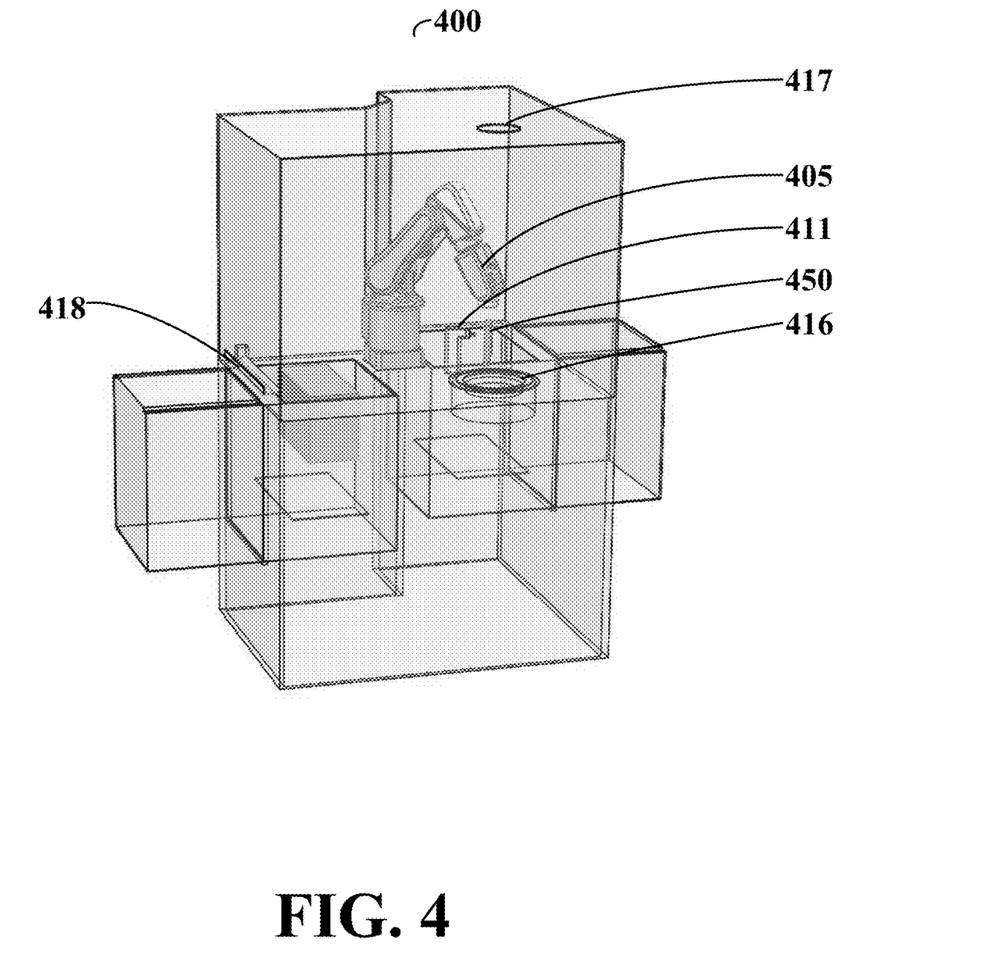
FIG. 4 is a perspective view of a workpiece cleaning apparatus, consistent with various aspects of the present disclosure.

FIG. 4 illustrates a parts cleaning area of a workpiece cleaning apparatus 400. In FIG. 4, manipulator 405 is grasping a motor base assembly 450 via an end effector. The manipulator 405 moves the motor base assembly 450 based on a cleaning recipe, in relation to a first gaseous material nozzle 411. A first gaseous material (e.g., carbon dioxide) flowing from the nozzle 411 impacts the motor base assembly 450 and ejects particulates or other contamination into the atmospheric environment of the workpiece cleaning apparatus 400. A ventilator (416, 417, and 418) then removes the particulates from the atmospheric environment of the workpiece cleaning apparatus 400. The ventilator, including second gaseous material supply 417, second gaseous material supply 418 and exhaust 416, creates a low pressure area around the parts cleaning area, which removes particulates from the workpiece cleaning apparatus 400. Specifically, the exhaust 416 evacuates more of the second gaseous material than the second gaseous material supplies 417 and 418 are able to provide, creating a pressure differential (e.g., a low pressure area) around the parts cleaning area. In some embodiments, this pressure differential can be monitored by atmospheric pressure sensors. When the pressure differential drops below a programmed minimum pressure differential threshold (e.g., the low pressure area around the part cleaning area is diminished), the exhaust 416 evacuation rate is increased to restore the desired pressure differential.

Figure 5A:
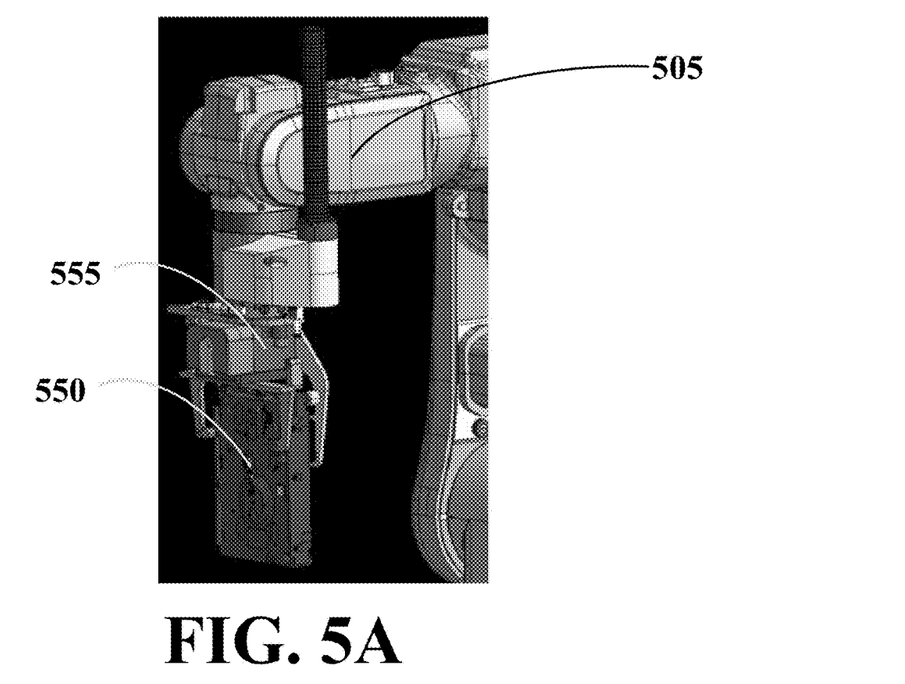
FIG. 5A is a perspective view of a manipulator of a workpiece cleaning apparatus holding a motor base assembly via an end effector, consistent with various aspects of the present disclosure.
Figure 5B:
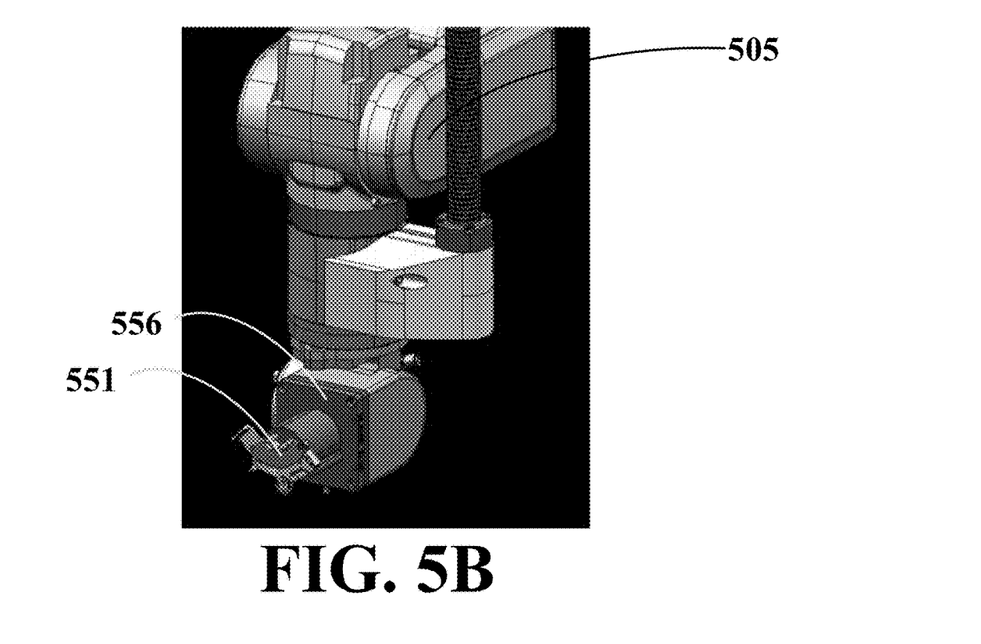
FIG. 5B is a perspective view of a manipulator of a workpiece cleaning apparatus holding a voice-coil motor via an end effector, consistent with various aspects of the present disclosure.

FIGS. 5A and 5B illustrate end effectors 555 and 556 used by a manipulator 505 for grasping motor base assemblies 550, and voice coil motors 551, respectively. The end effectors 555 and 556 can be implemented such that a relatively small amount of surface area on the parts is used for gripping, thus facilitating cleaning of a majority of each part. The end effectors 555 and 556 may, for example, be implemented with manipulators as shown in the other figures.

Figure 6A:
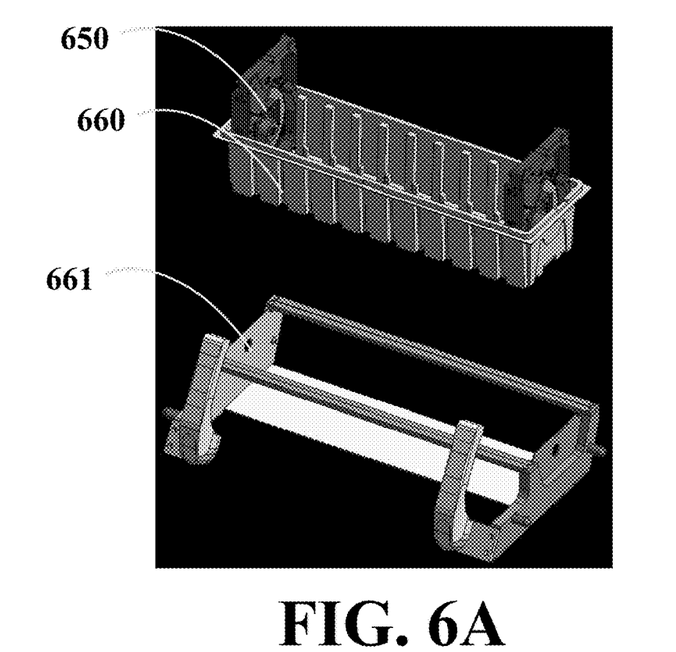
FIG. 6A is a perspective view of a motor base assembly pallet tray, consistent with various aspects of the present disclosure.
Figure 6B:
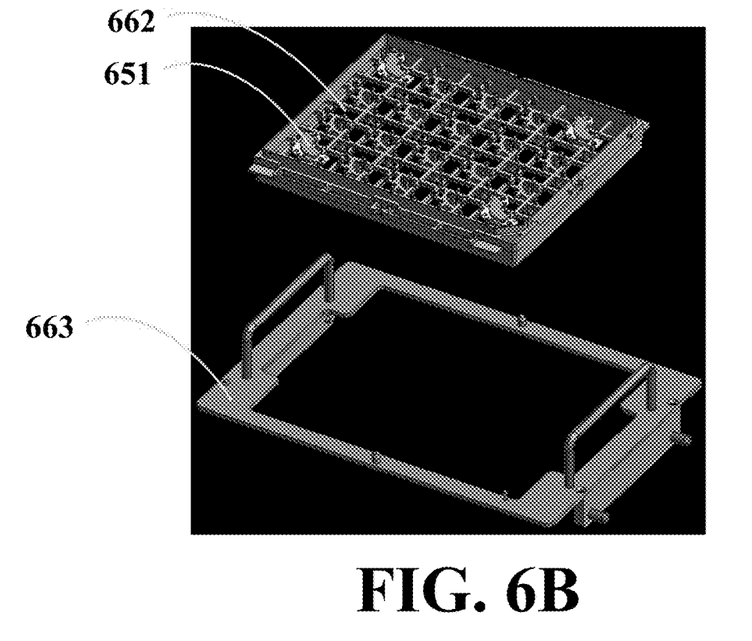
FIG. 6B is a perspective view of a voice coil motor pallet tray, consistent with various aspects of the present disclosure.

FIGS. 6A and 6B show perspective views of a motor base assembly pallet tray and a voice coil motor pallet tray respectively, as may be implemented in connection with one or more embodiments. To identify parts, such as motor base assemblies 650 and voice coil motors 651, each part is labeled with a bar code scanner. Each bar code is read by a part identifying circuit and associated with a particular part. Trays (660 and 662) and pallets (661 and 663) position the barcode for each part in a known three-dimensional location. This allows a part identifying circuit to accurately identify a variety of parts loaded into a workpiece cleaning apparatus. Such a system mitigates or prevents the need for a preliminary identification of the part, as may be implemented for associating a cleaning recipe. Using such approaches, a variety of different parts can be cleaned without significant re-tooling or the need for operator intervention.

Figure 7:
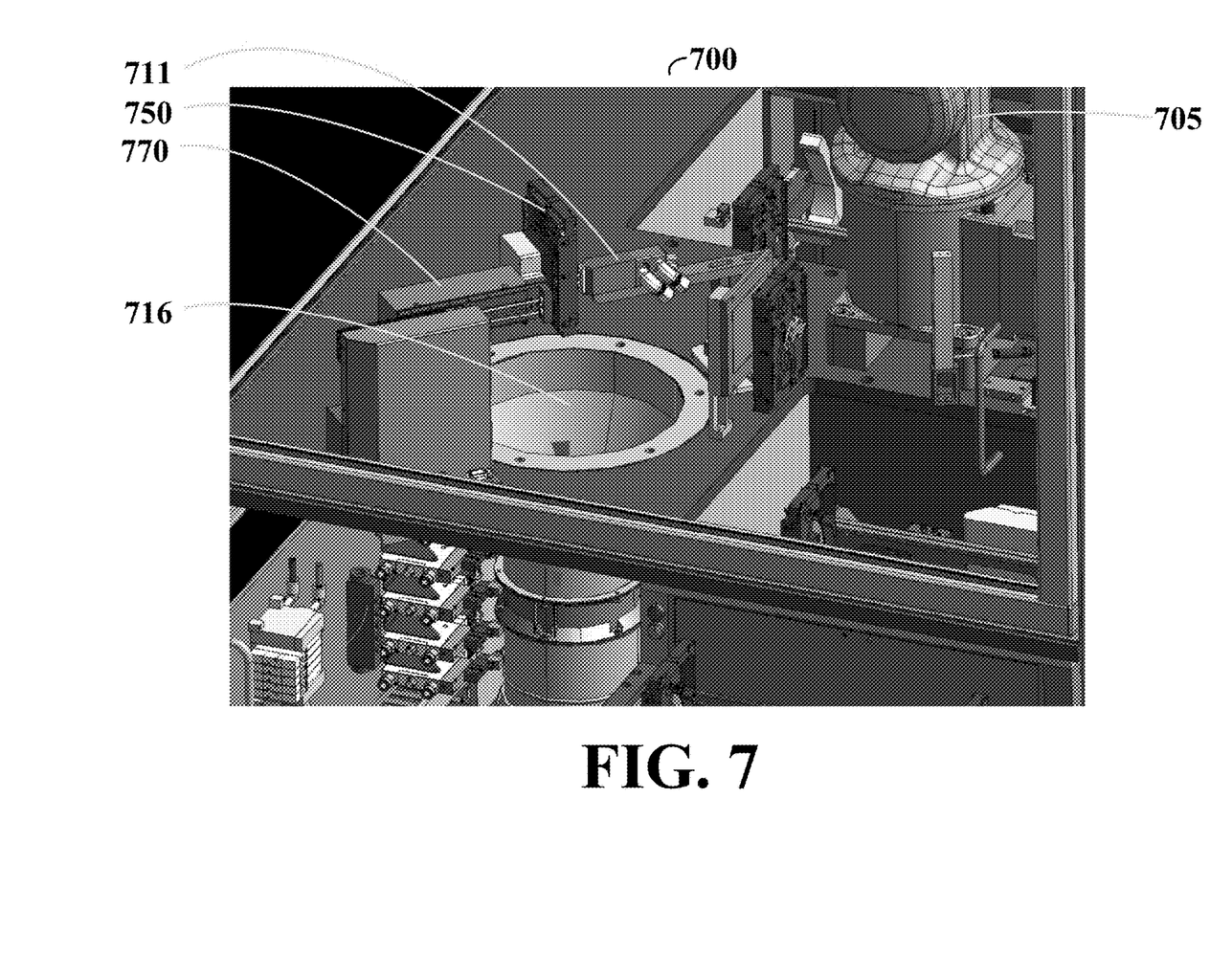
FIG. 7 is a perspective view of a part cleaning area of a workpiece cleaning apparatus, consistent with various aspects of the present disclosure.

FIG. 7 illustrates a part cleaning area of a workpiece cleaning apparatus 700. A motor base assembly 750 is positioned by a manipulator 705 to engage two pins 770, coupled to a DC power supply, with motor contacts on the motor base assembly 750. Upon contact of the two pins 770 and the motor contact, the motor operates. The apparatus 700 then initiates a cleaning recipe including a sub-recipe for cleaning the motor base assembly 750 motor area. A gas supply nozzle 711 is supplied with a first gaseous material that impacts on and around the motor while operating, removing contamination therefrom. After completion of the motor area sub-recipe, the rest of the top-side of the motor base assembly 750 is cleaned, followed by the back side. Contamination is removed from the atmospheric environment via ventilation 716 (e.g., using approaches such as those described above).

Various modules or other circuits may be implemented to carry out one or more of the operations and activities described herein and/or shown in the figures. In these contexts, a "module" is a circuit that carries out one or more of these or related operations/activities (e.g., a part identifying circuit, or a control circuit). For example, in certain of the above-discussed embodiments, one or more modules are discrete logic circuits or programmable logic circuits, configured and arranged for implementing these operations/activities, as in the circuit modules that carry out the operations of the part identifying circuit and control circuit. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules may include a combination of a CPU hardware-based circuit and a set of instructions in the form of firmware, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present invention without strictly following the exemplary embodiments and applications illustrated and described herein. For example, the workpiece cleaning apparatus need not be limited to the cleaning of individual parts, but may be used for the cleaning of part assemblies (e.g., hard disc drive assemblies). Moreover, various approaches to modifying or otherwise implementing cleaning approaches as described with regard to certain embodiments, may be carried out with other embodiments. Such modifications do not depart from the true spirit and scope of the present invention, including that set forth in the following claims.

What is claimed is:

1. A method comprising:
identifying a type of a part to be decontaminated;
determining a cleaning recipe based upon the identified type of the part, the cleaning recipe including a part cleaning path specific to the identified part type;
based upon the cleaning recipe, flowing gaseous material from a gas supply along the part and dislodging particles from the part in a part cleaning area with the gaseous material by manipulating the part relative to the gas supply and according to the part cleaning path;
while dislodging particles from the part in the part cleaning area, monitoring an amount of the dislodged particles in an output staging area adjacent the part cleaning area; and
in response to the amount of monitored dislodged particles exceeding a threshold level in the output staging area, adaptively modifying the cleaning recipe by modifying the part cleaning path, and dislodging further particles from the part in the part cleaning area with the gaseous material by manipulating the part relative to the gas supply according to the modified part cleaning path.

2. The method of claim 1,
further including retrieving the part, including a contaminated hard disc drive motor base assembly having a motor and a base, from an input staging area and moving the part to the cleaning area in which the part is decontaminated, the part cleaning area being adjacent the input staging area and the output staging area;
wherein identifying the type of part includes identifying the type of hard disc drive motor base assembly in the input staging area;
wherein dislodging the particles includes decontaminating the motor base assembly by:
    engaging the motor base assembly to pins coupled to a DC power source,
    operating the motor via the pins and the DC power source,
    dislodging particles from the motor via the flow of gaseous material while the motor is operating, and
    after dislodging the particles from the motor, disengaging the motor base assembly from the pins and using the flow of gaseous material to dislodge particles from a front side of the motor base assembly and from a back side of the motor base assembly; and
further including after dislodging the particles from the motor, from the front side of the motor base assembly and from the back side of the motor base assembly, placing the decontaminated motor base assembly in the output staging area.

3. The method of claim 1, wherein dislodging the particles includes:
    providing a laminar flow of the gaseous material along the part to remove contamination from the part;
    monitoring the amount of the dislodged particles in the output staging area adjacent the part as contamination is removed therefrom; and
    in response to the amount of monitored dislodged particles, adjusting positioning of the part relative to the gas supply.

4. The method of claim 1, wherein manipulating the part includes using an electromechanical manipulator configured and arranged to engage with and manipulate parts, and to move the parts between an input staging area, the part cleaning area and the output staging area, and using a control circuit to execute instructions with the cleaning recipe via the control circuit and control the electromechanical manipulator based on the executed instructions.

5. The method of claim 1, wherein manipulating the part includes using a manipulator having an end effector configured and arranged for manipulating the identified type of part, further including, prior to manipulating the part,
    selecting an end effector based on the identified type of part,
    determining whether the selected end effector is coupled to the manipulator,
    in response to determining that the selected end effector is coupled to the manipulator, using the manipulator with the selected end effector coupled thereto,
    in response to detecting that an end effector that is different than the selected end effector is coupled to the manipulator, decoupling the different end effector from the manipulator, and
    in response to determining that the selected end effector is not coupled to the manipulator, coupling the selected end effector to the manipulator and using the manipulator with the selected end effector coupled thereto.

6. The method of claim 1, wherein flowing the gaseous material includes providing a laminar flow of the gaseous material along the part and using the laminar flow to dislodge the particles.

7. The method of claim 1, further including mitigating contamination of parts by controlling a ventilator to exhaust the dislodged particles by supplying and exhausting an additional gaseous material.

8. The method of claim 1, wherein flowing the gaseous material includes, while dislodging the particles from the part, dynamically adjusting the cleaning recipe to maintain laminar flow of the gaseous material along the part.

9. The method of claim 1, wherein adaptively modifying the cleaning recipe includes modifying at least one of gas pressure and type of the gaseous material.

10. The method of claim 1, wherein adaptively modifying the cleaning recipe includes re-calculating the part cleaning path along which the part is manipulated and adjusting a pressure of the gaseous material, based on the monitored amount of the dislodged particles.

11. The method of claim 1, wherein
determining the cleaning recipe includes accessing a lookup table containing types of parts associated with respective cleaning recipe data sets and loading a cleaning recipe data set based on the type of the part to be decontaminated, and
manipulating the part relative to the gas supply includes executing stored instructions that, with the loaded cleaning recipe data set as an input, cause a manipulator to manipulate the part along a cleaning path defined in the loaded cleaning recipe data set.

12. The method of claim 1, wherein
identifying the type of part to be decontaminated includes accessing a database, including a plurality of three-dimensional part renderings of respective parts, and retrieving from the database, one of the three-dimensional part renderings corresponding to the part; and
determining the cleaning recipe includes, based on the retrieved three-dimensional part rendering, generating and storing an executable cleaning recipe that, when executed by a control circuit, causes the control circuit to manipulate a manipulator relative to the part and to maintain laminar flow of the gaseous material along the part.

13. The method of claim 1, wherein
flowing the gaseous material includes impacting a laminar flow of the gaseous material against the part with a predetermined path; and
adaptively modifying the cleaning recipe includes controlling both an impact force and an angle of incidence of the gaseous material upon the part.

14. The method of claim 1, wherein flowing the gaseous material includes providing non-laminar flow of the gaseous material along the part by manipulating the part based upon the cleaning recipe associated with the identified type of part.

15. The method of claim 1, further including using a loader apparatus to load a tray with parts, including said part, into an input staging area in a known orientation and position, wherein identifying the type of the part includes associating the type of the part via a lookup table with a known part placement scheme in the loader apparatus.

16. The method of claim 1, wherein identifying the type of the part to be decontaminated includes accessing a radio frequency identification device on the part, and identifying the types via wireless information received from the radio frequency identification device.

17. The method of claim 1, wherein dislodging the particles includes dislodging dry particles from the part by flowing the gaseous material along the part in the part cleaning area, further including flowing additional gas to exhaust the dry particles from the part cleaning area.

18. The method of claim 4, wherein the steps of identifying the type of the part, determining the cleaning recipe and monitoring the amount of the dislodged particles are carried out with the control circuit.

19. A method comprising:
providing a plurality of differently-shaped parts; and
for each of the plurality of differently-shaped parts,
  identifying a type of the part,
  determining a cleaning recipe based on the identified type of the part, the cleaning recipe including a part cleaning path that is specific to the identified type and shape of the part, and
  dislodging particles from the part in a part cleaning area with gaseous material provided by a gas supply and flowed along the part, by manipulating the part relative to the gas supply according to the part cleaning path;
  while dislodging the particles from the part in a part cleaning area, monitoring an amount of the dislodged particles in an output staging area adjacent the part cleaning area; and
  in response to the amount of monitored dislodged particles exceeding a threshold level in the output staging area, adaptively modifying the cleaning recipe by modifying the part cleaning path, and dislodging further particles from the part in the part cleaning area with the gaseous material by manipulating the part relative to the gas supply according to the modified part cleaning path.

* * * * *